United States Patent
Wakeham

(12) 
(10) Patent No.: US 6,486,835 B1
(45) Date of Patent: Nov. 26, 2002

(54) METHOD AND APPARATUS FOR DETECTING PHYSICAL POSITION OF A RETRACTABLE ANTENNA

(75) Inventor: Chris Wakeham, San Diego, CA (US)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/774,787

(22) Filed: Jan. 31, 2001

(51) Int. Cl.[7] .................................................. H01Q 1/24
(52) U.S. Cl. ........................ 343/702; 343/725; 343/895
(58) Field of Search .............................. 343/702, 725, 343/876, 895, 900; H01Q 1/24

(56) References Cited

U.S. PATENT DOCUMENTS

| | | | | |
|---|---|---|---|---|
| 5,479,178 A | * | 12/1995 | Ha .................................. | 343/702 |
| 5,548,827 A | * | 8/1996 | Hanawa et al. ............... | 455/129 |
| 5,731,791 A | * | 3/1998 | Jang .............................. | 343/702 |
| 5,815,820 A | | 9/1998 | Kiem et al. .................... | 455/575 |
| 5,898,933 A | | 4/1999 | Kaschke ....................... | 455/575 |
| 5,923,297 A | * | 7/1999 | Kim et al. ..................... | 343/702 |
| 5,987,311 A | | 11/1999 | Phillips ......................... | 455/90 |
| 6,006,117 A | * | 12/1999 | Hageltorn et al. ............ | 455/575 |
| 6,064,863 A | * | 5/2000 | Matai ............................ | 455/90 |
| 6,195,050 B1 | * | 2/2001 | Kim .......................... | 343/700 MS |

FOREIGN PATENT DOCUMENTS

| | | |
|---|---|---|
| FR | 2712443 A1 | 5/1995 |
| WO | WO-95/13668 A1 | 5/1995 |

* cited by examiner

Primary Examiner—Tho Phan
(74) Attorney, Agent, or Firm—Herrington & Smith, LLP

(57) ABSTRACT

Disclosed is a method and apparatus for use in a wireless terminal for detecting a position of a retractable antenna relative to a fixed antenna. The method has steps of positioning an electrical contact for being electrically coupled to the retractable antenna only when the retractable antenna is retracted within a body of the wireless terminal, and at least partially contained within the fixed antenna; detecting a presence of RF energy that is coupled into the retractable antenna from the fixed antenna, wherein the detected presence of the RF energy is indicative of the retractable antenna being in the retracted position; and, if the retractable antenna is not indicated to be in the retracted position, transmitting RF energy from the retractable antenna using more RF power than if the retractable antenna were indicated to be in the retracted position. In the preferred embodiment the retractable antenna is used when operating in the AMPS mode, and the fixed antenna is used when operating in other than the AMPS mode, such as when operating in the CDMA mode.

19 Claims, 2 Drawing Sheets

METHOD AND APPARATUS FOR DETECTING PHYSICAL POSITION OF A RETRACTABLE ANTENNA

FIELD OF THE INVENTION

This invention relates generally to radio frequency (RF) antennas and antenna circuitry and, more particularly, pertains to extendable/retractable antennas.

BACKGROUND OF THE INVENTION

It is well known in the art to provide RF antennas that can be extended so as to protrude from a device during use of the device. For example, in a radiotelephone, which could also be referred to as a wireless terminal, a personal communicator, a mobile station or as a cellular telephone, it is known to provide two different antennas. Referring also to FIG. 1, a first antenna 1 intended for use with a first set of transmission and reception frequency bands is formed as a meander transmission line, or simply as a helically wrapped length of conductor, that is disposed about a circular cylindrical or otherwise shaped form 2. The first antenna 1 is assumed to be fixed in position. The form 2 is hollow, and contains within (when fully retracted) a second antenna 3. The second antenna 3 can be a rod-shaped whip-type antenna that is capable of sliding within the form 2 so that it can be extended by the user. In the presently preferred embodiment the form 2 is contained within the body of a wireless terminal 4. When the second antenna 3 retracted only the first antenna 1 is electrically active. The first antenna 1 is coupled, via a duplexer 5, to an RF transceiver 6. When the second antenna 3 is fully extended, shown in dashed outline, it makes electrical contact at 3A with the distal end of the first antenna 1, and is coupled through the first antenna 1 to the RF transceiver 6 (or to a second RF transceiver, not shown).

It can be important to detect the position of the second antenna, as the specified maximum radiated power may be different when using the first antenna as compared to the second antenna. For example, one may reasonably assume that the first antenna 1 is used when transceiving RF signals in accordance with a CDMA air interface standard, and that the second antenna 3 is used when transceiving RF signals in accordance with a second air interface standard, such as one known as AMPS. Generally, when in the AMPS mode it is typically desirable to use more transmitted power than when in the CDMA mode. The increase in transmitted power is preferably made, however, when the second antenna is extended out of the body of the wireless terminal 4, and not retracted into the body of the wireless terminal 4. This enables an increase in performance in the AMPS mode, while still meeting predetermined RF emission limits.

It is possible to position a mechanical switch 7 so as to detect when the second antenna is in the fully retracted position, and to couple an output of the switch 7 to a control unit 8, such as a microprocessor, within the wireless terminal 4. By detecting the state of the switch 7 the control unit 8 is enabled to determine whether it can transmit with maximum power using the second antenna 3.

However, the use of the mechanical switch 7 has several disadvantages, including increased cost, decreased reliability, and increased manufacturing and testing complexity.

OBJECTS AND ADVANTAGES OF THE INVENTION

It is a first object and advantage of this invention to provide an improved technique for detecting a position of a moveable antenna.

It is a further object and advantage of this invention to provide a technique for detecting the position of a retractable antenna that does not use a mechanical switch, and that thus does not experience the problems inherent in the use of a mechanical switch.

SUMMARY OF THE INVENTION

The foregoing and other problems are overcome and the foregoing objects and advantages are realized by methods and apparatus in accordance with embodiments of this invention.

A circuit and method are disclosed for detecting a position of a movable antenna relative to a fixed antenna. The circuit includes an electrical contact positioned for being electrically coupled to the movable antenna only when the movable antenna is in a first predetermined position relative to the fixed antenna; and an RF detection circuit having an input coupled to the electrical contact for detecting a presence of RF energy that is coupled into the movable antenna from said fixed antenna. The detected presence of the RF energy is indicative of the moveable antenna being in the predetermined position relative to the fixed antenna. The fixed antenna is disposed along a length of the movable antenna when said movable antenna is in said first predetermined position. For example, the fixed antenna is disposed circumferentially about a hollow form and the movable antenna is a rod-shaped, whip-type antenna that is disposed within the form such that it is slidable therein between a fully retracted position and a fully extended position. When in the first predetermined position the movable antenna is in the fully retracted position. In the presently preferred embodiment the RF detection circuit includes a detection diode, at least one RF filter coupled in series between an input of the detection diode and the electrical contact, a capacitance coupled to an output of the detection diode for storing charge detected by the detection diode such that the capacitance has a potential impressed thereon by the charge, and a comparator for comparing the potential to a predetermined potential. The comparator has an output the state of which indicates whether or not the first antenna is in the first predetermined position.

Also disclosed is a method for use in a wireless terminal for detecting a position of a retractable antenna relative to a fixed antenna. The method has steps of positioning an electrical contact for being electrically coupled to the retractable antenna only when the retractable antenna is retracted within a body of the wireless terminal, and at least partially contained within the fixed antenna; detecting a presence of RF energy that is coupled into the retractable antenna from the fixed antenna, wherein the detected presence of the RF energy is indicative of the retractable antenna being in the retracted position; and, if the retractable antenna is not indicated to be in the retracted position, transmitting RF energy from the retractable antenna using more RF power than if the retractable antenna were indicated to be in the retracted position. In the preferred embodiment the retractable antenna is used when operating in the AMPS mode, and the fixed antenna is used when operating in other than the AMPS mode, such as when operating in the CDMA mode.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
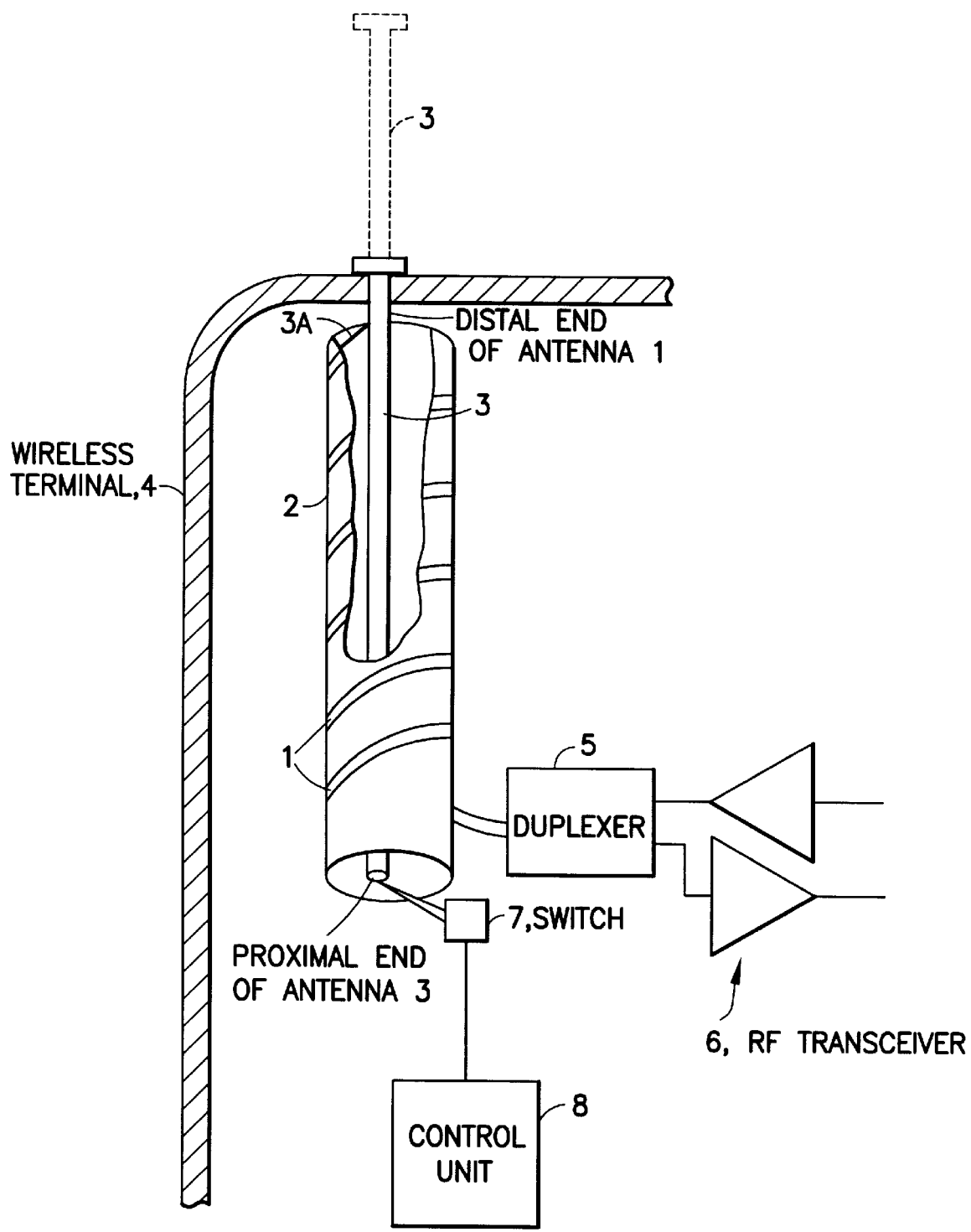
FIG. 1 is diagram showing ad conventional arrangement of a fixed antenna and a retractable antenna, as well as associated components.
Figure 2:
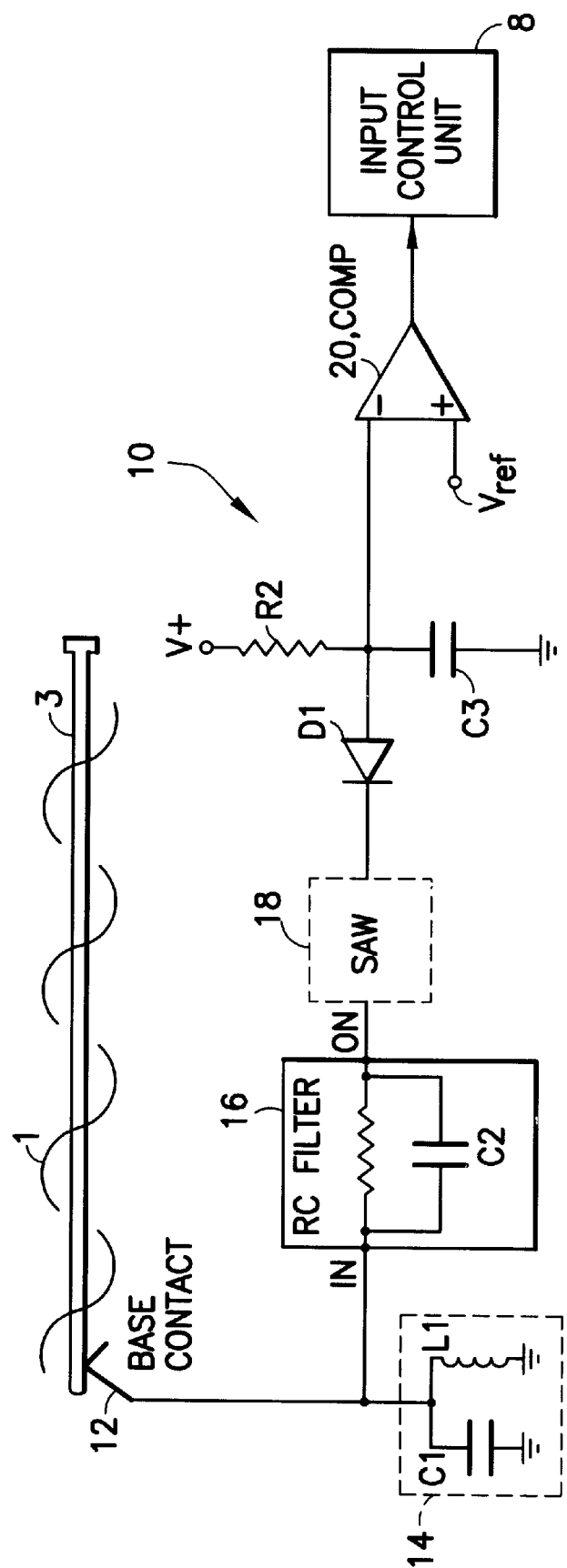
FIG. 2 is a schematic diagram of electronic circuitry for detecting the position of the retractable antenna in accordance with the teachings of this invention.

FIG. 2 is a schematic diagram of an electronic circuit 10 for detecting the position of the retractable antenna 3 in accordance with the teachings of this invention, wherein components that appear as well in FIG. 1 are numbered accordingly. The electronic circuitry includes a base contact 12 for engaging the proximal end of the whip antenna 3 when the whip antenna 3 is fully retracted into the body of the wireless terminal. At this time the whip antenna 3 is assumed to be contained within the form 2, and the first antenna 1 is thus disposed about the length of the whip antenna 3. The purpose of the base contact 12 is to electrically connect the whip antenna 3 to the remainder of the electronic circuit 10. When the whip antenna 3 is withdrawn or extended by some amount the connection to the base contact 12 is open circuited.

An impedance matching network 14, containing capacitance C1 and inductance L1, is typically provided for use with the first antenna 1 (i.e., when the whip antenna is in the retracted position as shown).

The electronic circuit 10 further includes an RC filter 16, containing resistor R1 and capacitance C2, having an input node (IN) that is connected to the proximal end of the whip antenna 3, when fully retracted, by the base contact 12. An output node (ON) of the RC filter 16 is connected to an (optional) SAW filter 18 that provides rejection of signals resulting from a single tone emitter transmitting in a different frequency band. The output of the SAW filter 18 is connected to the cathode of a detection diode D1. The anode of D1 is connected to a bias network implemented as a resistor R2. The bias network provides sufficient forward bias to D1 to bias it slightly on. Also connected to the anode of D1 is a first plate of capacitance C3, while the second plate of C3 is connected to circuit ground. The first plate of C3 is connected to a first input of a voltage comparator (COMP) 20, while the second input of comparator 20 is connected to a reference potential (Vref). The output of the comparator 20 is coupled either directly or indirectly to an input port of the control unit 8, which can read thereby read the output state of the comparator 20.

In operation, and assuming the whip antenna 3 is fully retracted, the base contact 12 electrically couples the proximal end of the whip antenna 3 to the input node of the RC filter 16. When RF energy is applied to the first antenna 1 during a transmission some of the RF energy is coupled into the whip antenna 3. This coupling of RF energy occurs even though the whip antenna 3 may nit be tuned or optimized for operation in the band of frequencies of antenna 1. The RF energy coupled into the whip antenna 3 passes through the base contact 12, through the RC filter 16, and is detected by D1. The resulting detected RF energy causes charge to begin to be stored on C3. At this time the output of comparator 20 is assumed to off, i.e., in a state that indicates that the whip antenna 3 is not retracted. The resulting voltage potential across C3 gradually increases, increasing the voltage potential applied to the first input of the comparator 20. This condition persists until the voltage potential across C3, and hence the magnitude of the voltage potential appearing at the first input of the comparator 20, exceeds the magnitude of Vref. At this time the output of the comparator 20 changes state, which indicates to the control unit 8 that the whip antenna 3 is retracted. It should be remembered that when the whip antenna 3 is retracted into the body of the wireless terminal 4 that the first antenna 1, the meander antenna, is assumed to be in use.

When the user extends the whip antenna 3 the connection to the base contact 12 is opened, thereby removing the source of the RF signal to D1. The magnitude of the potential across C3 subsequently falls below the magnitude of Vref, and the output of the comparator 20 changes state to indicate that the whip antenna 3 is extended. In this manner the control unit 8 is made aware of the fact that the whip antenna 3 is not retracted and, should the AMPS mode of the wireless terminal 4 be active, the control unit 8 is enabled to apply maximum RF power to the whip antenna 3 when transmitting. If the extended condition is not indicated by the output of the comparator 20, and if the AMPS mode is in effect, then the control unit 8 does not apply the maximum RF power to the whip antenna 3 when transmitting.

Representative values for certain of the components shown in FIG. 2 are as follows: R1 and R2=22 k$\Omega$, C2=47 pF, C3=47 pF, and Vref=1.244V (band gap reference). It should be noted that Vref is an already existing reference potential, and its use in the electronic circuit 10 is thus advantageous as a separate reference potential is not required. This being the case the values of the other components are selected accordingly to generate a potential that exceeds 1.224V at the first input of the comparator 20. Should some other reference potential be selected for use as Vref then the listed component values may be required to be adjusted accordingly. Such modifications are well within the capabilities of those skilled in the art, when guided by the foregoing teachings.

Other modifications to the electronic circuit 10 can also be employed, such as by providing a full wave rectifier in place of the half wave rectifier function performed by D1. Other techniques for detecting the magnitude of the signal appearing across C3 can also be applied, such as by using a multi-bit analog-to-digital converter (ADC) in place of the essentially single bit ADC function performed by the comparator 20. It should be realized, however, that the nature and scope of any such modifications may be constrained by the cost, complexity, power consumption and size requirements of the intended application. The illustrated embodiment is advantageous in that it provides a solution that eliminates the requirement for a mechanical switch to detect the position of the retractable antenna 3, and does so at low cost, low complexity, small size and with low power consumption.

The use of the teachings of this invention may also be employed in other than wireless terminals, which may be viewed as a presently preferred, but not limiting application for these teachings.

Thus, while the invention has been particularly shown and described with respect to preferred embodiments thereof, it will be understood by those skilled in the art that changes in form and details may be made therein without departing from the scope and spirit of the invention.

What is claimed is:

1. A circuit for detecting a position of a movable antenna relative to a fixed antenna, comprising:

an electrical contact positioned for being electrically coupled to said movable antenna only when said movable antenna is in a first predetermined position relative to said fixed antenna; and an RF detection circuit having an input coupled to said electrical contact for detecting a presence of RF energy that is coupled into said movable antenna from said fixed antenna, wherein said detected presence of said RF energy is indicative of said moveable antenna being in said predetermined position relative to said fixed antenna.

2. A circuit as in claim 1, wherein said fixed antenna is disposed along a length of said movable antenna when said, movable antenna is in said first predetermined position.

3. A circuit as in claim 1, wherein said fixed antenna is disposed around a length of said movable antenna when said movable antenna is in said first predetermined position.

4. A circuit as in claim 1, wherein said fixed antenna is disposed upon a hollow form, wherein said movable antenna is disposed within said form such that said movable antenna is slidable therein between a fully retracted position and a fully extended position, and wherein when in said first predetermined position said movable antenna is in said fully retracted position.

5. A circuit as in claim 1, wherein said fixed antenna is disposed circumferentially about a hollow form, wherein said movable antenna is disposed within said form such that said movable antenna is slidable therein between a fully retracted position and a fully extended position, and wherein when in said first predetermined position said movable antenna is in said fully retracted position.

6. A circuit as in claim 1, wherein said fixed antenna is supported by a hollow form that is disposed within a wireless terminal, wherein said movable antenna is comprised of a rod-shaped antenna that is disposed within said form such that said movable antenna is slidable therein between said first predetermined position, that is a fully retracted position wherein a substantial portion of said movable antenna is disposed within said wireless terminal, and a second position that is a fully extended position wherein a substantial portion of said movable antenna is disposed external to said wireless terminal.

7. A circuit as in claim 1, wherein said RF detection circuit comprises:

a detection diode;

at least one RF filter coupled in series between an input of said detection diode and said electrical contact;

a capacitance coupled to an output of said detection diode for storing charge detected by said detection diode, said capacitance having a potential impressed thereon by said charge; and a comparator for comparing said potential to a predetermined potential, said comparator having an output the state of which indicates whether or not said movable antenna is in said first predetermined position.

8. A method for detecting a position of a movable antenna relative to a fixed antenna, comprising steps of:

positioning an electrical contact for being electrically coupled to said movable antenna only when said movable antenna is in a first predetermined position relative to said fixed antenna; and detecting through said electrical contact a presence of RF energy that is coupled into said movable antenna from said fixed antenna, wherein said detected presence of said RF energy is indicative of said moveable antenna being in said predetermined position relative to said fixed antenna.

9. A method as in claim 8, wherein said fixed antenna is disposed along a length of said movable antenna when said movable antenna is in said first predetermined position.

10. A method as in claim 8, wherein said fixed antenna is disposed around a length of said movable antenna when said movable antenna is in said first predetermined position.

11. A method as in claim 8, wherein said fixed antenna is disposed upon a hollow form, wherein said movable antenna is disposed within said form such that said movable antenna is slidable therein between a fully retracted position and a fully extended position, and wherein when in said first predetermined position said movable antenna is in said fully retracted position.

12. A method as in claim 8, wherein said fixed antenna is disposed circumferentially about a hollow form, wherein said movable antenna is disposed within said form such that said movable antenna is slidable therein between a fully retracted position and a fully extended position, and wherein when in said first predetermined position said movable antenna is in said fully retracted position.

13. A method as in claim 8, wherein said fixed antenna is supported by a hollow form that is disposed within a wireless terminal, wherein said movable antenna is comprised of a rod-shaped antenna that is disposed within said form such that said movable antenna is slidable therein between said first predetermined position, that is a fully retracted position wherein a substantial portion of said movable antenna is disposed within said wireless terminal, and a second position, that is a fully extended position wherein a substantial portion of said movable antenna is disposed external to said wireless terminal.

14. A method as in claim 8, wherein said step of detecting comprises steps of:

providing a detection diode, a least one RF filter coupled in series between an input of said detection diode and said electrical contact, and a capacitance coupled to an output of said detection diode;

storing charge detected by said detection diode resulting from RF energy that is coupled into said movable antenna from said fixed antenna, said capacitance having a potential impressed thereon by said charge; and comparing said potential to a predetermined potential for indicating whether or not said movable antenna is in said first predetermined position.

15. A method as in claim 8, wherein if said movable antenna is not indicated to be in said first predetermined position, further comprising a step of transmitting from said movable antenna using more RF power than if said movable antenna were indicated to be in said first predetermined position.

16. In a wireless terminal, a method for detecting a position of a retractable antenna relative to a fixed antenna, comprising steps of:

positioning an electrical contact for being electrically coupled to said retractable antenna only when said retractable antenna is in a retracted position by being retracted within a body of said wireless terminal and at least partially contained within said fixed antenna;

detecting, using said electrical contact, a presence of RF energy that is coupled into said retractable antenna from said fixed antenna, wherein said detected presence of said RF energy is indicative of said retractable antenna being in said retracted position; and if said retractable antenna is not indicated to be in said retracted position, transmitting RF energy from said retractable antenna using more RF power than if said retractable antenna were indicated to be in said retracted position.

17. A method as in claim 16, wherein said retractable antenna is used when operating in an AMPS mode, and wherein said fixed antenna is used when operating in other than an AMPS mode.

18. A circuit for detecting a position of a movable antenna relative to a fixed antenna, comprising:

an electrical contact positioned for being electrically coupled to said movable antenna only when said movable antenna is in a first predetermined position relative to said fixed antenna; and an RF detection circuit having an input coupled to said electrical contact for detecting a presence of RF energy that is coupled into said movable antenna from said fixed antenna, wherein said detected presence of said RF energy is indicative of said moveable antenna being in said predetermined position relative to said fixed antenna, said RF detection circuit comprising a detection diode; at least one RF filter coupled in series between an input of said detection diode and said electrical contact; a capacitance coupled to an output of said detection diode for storing charge detected by said detection diode, said capacitance having a potential impressed thereon by said charge; and a comparator for comparing said potential to a predetermined potential, said comparator having an output the state of which indicates whether or not said movable antenna is in said first predetermined position.

19. A method for detecting a position of a movable antenna relative to a fixed antenna, comprising:

positioning an electrical contact for being electrically coupled to said movable antenna only when said movable antenna is in a first predetermined position relative to said fixed antenna; and detecting a presence of RF energy that is coupled into said movable antenna from said fixed antenna, wherein said detected presence of said RF energy is indicative of said moveable antenna being in said predetermined position relative to said fixed antenna;

wherein detecting comprises (i) providing a detection diode, a least one RF filter coupled in series between an input of said detection diode and said electrical contact, and a capacitance coupled to an output of said detection diode; (ii) storing charge detected by said detection diode resulting from RF energy that is coupled into said movable antenna from said fixed antenna, said capacitance having a potential impressed thereon by said charge; and (iii) comparing said potential to a predetermined potential for indicating whether or not said movable antenna is in said first predetermined position.

* * * * *

UNITED STATES PATENT AND TRADEMARK OFFICE
CERTIFICATE OF CORRECTION

PATENT NO. : 6,486,835 B1
DATED : November 26, 2002
INVENTOR(S) : Wakeham

It is certified that error appears in the above-identified patent and that said Letters Patent is hereby corrected as shown below:

<u>Title page,</u>
Item [74], *Attorney, Agent, or Firm*, change "Herrington & Smith, LLP" to
-- Harrington & Smith, LLP --

Signed and Sealed this

Twenty-seventh Day of May, 2003

JAMES E. ROGAN
*Director of the United States Patent and Trademark Office*